United States Patent [19]
VanHuben et al.

[11] Patent Number: 6,134,676
[45] Date of Patent: Oct. 17, 2000

[54] PROGRAMMABLE HARDWARE EVENT MONITORING METHOD

[75] Inventors: Gary Alan VanHuben; Carl B. Ford, III, both of Poughkeepsie, N.Y.

[73] Assignee: International Business Machines Corporation, Armonk, N.Y.

[21] Appl. No.: 09/070,145

[22] Filed: Apr. 30, 1998

[51] Int. Cl.[7] ................................................. G06F 11/00
[52] U.S. Cl. ................................................. 714/39; 714/47
[58] Field of Search .................................. 714/39, 45, 47, 714/37, 38; 364/264, 264.1, 264.4

[56] References Cited

U.S. PATENT DOCUMENTS

| | | |
|---|---|---|
| 3,644,927 | 2/1972 | Green . |
| 3,831,149 | 8/1974 | Job ............................................ 714/37 |
| 4,022,978 | 5/1977 | Connell et al. . |
| 4,435,759 | 3/1984 | Baum et al. . |
| 4,821,178 | 4/1989 | Levin et al. . |
| 4,845,615 | 7/1989 | Blasciak .................................... 714/10 |
| 4,937,740 | 6/1990 | Agarwal et al. .......................... 714/38 |
| 5,210,862 | 5/1993 | DeAngelis et al. . |
| 5,237,684 | 8/1993 | Record et al. . |
| 5,355,484 | 10/1994 | Record et al. . |
| 5,426,741 | 6/1995 | Butts, Jr. et al. . |
| 5,675,729 | 10/1997 | Mehring . |

OTHER PUBLICATIONS

"RISC Superscalar Pipeline Out–of–Order Statistics Gathering and Analysis" by Gariazzo et al., IBM Technical Disclosure Bulletin, vol. 37, No. 4B, Apr. 1994, pp. 385–387.

"Processor Performance Monitoring with Depiction of the Efficiency of Bus Utilization and Memory Accesses of Superscalar Microprocessor" by Levin et al., IBM Technical Disclosure Bulletin, vol. 40, No. 1, Jan. 1997, pp. 67–69.

Primary Examiner—Robert W. Beausoliel, Jr.
Assistant Examiner—Pierre E Elisca
Attorney, Agent, or Firm—Lynn L. Augspurger

[57] ABSTRACT

A system for monitoring hardware events in a computer system implements a hardware event monitor of control registers and has programmable generic fields which can be internally or externally programmed for monitoring events ranging from simple operations to complex event sequences. Using programmed criteria incorporated into the hardware event monitor to events within said computer system are monitored by initiating successive compares of programmed criteria with processing events. The hardware event monitor can trigger external actions upon successful detection of compares indicating that all criteria programmed into the hardware event monitor have been achieved. None of the bits within the Control Registers are mutually exclusive which allows multiple scenarios to be programmed. The hardware event monitor and system trace controls act as a single unified entity with remote programming of said hardware event monitor and trace controls over a UBUS to permit capturing and logging problem debugging and instrumentation data for use in remote system administration, technical support assistance, field and customer engineering applications, and performance analysis, and hardware error injection for recovery and diagnostic testing, and enabling dither to break resource deadlocks.

20 Claims, 9 Drawing Sheets

PROGRAMMABLE HARDWARE EVENT MONITORING METHOD

FIELD OF THE INVENTION

This invention is related to computers and computer systems and in particular to a programmable hardware event monitoring method.

BACKGROUND OF THE INVENTION

As computer systems migrate towards the use of sophisticated multi-stage pipelines and large SMP shared cache structures, the ability to debug, analyze, and verify the actual hardware becomes increasingly difficult, during development, test, and during normal operations. Today's technology employs such levels of integration within a single piece of silicon that interfacing with external test equipment can be inadequate. It is often desirable for testing to monitor complex events so that useful debug and performance information can be captured in a fast, unobtrusive manner during machine development. The prior art in the field relating to the present invention teach various approaches to monitoring events and capturing data which we will describe. Normally the prior art monitors predefined events, or uses hardware dedicated to a specific function. They have tended to count or sample the events, usually for the purpose of performance analysis or instrumentation. The monitored events are not of great scope and are generally hard wired in silicon, or programmed through field programmable gate arrays, a Processor Controller Element, the Operating System, or an external device which must be attached to the main computer system. For example U.S. Pat. No. 3,644,927 (issued to Greene) describes an event monitor for switches and relays. U.S. Pat. No. 4,022,978 (issued to Connell et al.) monitors communication traffic and counts events. U.S Pat. No. 4,821,178 (issued to Levin et al.) implements a Processor Controller Element (PCE) driven apparatus which performs instrumentation sampling on predefined events. U.S. Pat. No. 4,435,759 (issued to Baum et al.) describes an external hardware device for correlating hardware and software events primarily through the use of an address compare mechanism. U.S. Pat. No. 5,675,729 (issued to Mehring) provides a more sophisticated means of counting hard wired events using chained comparators performing boolean compares. IBM Technical Disclosure Bulletin entitled RISC Superscalar Pipeline Out-of-Order Statistics Gathering and Analysis (Vol. 37 NO. 04B April 1994) describes a system for monitoring instruction streams for a RISC microprocessor searching for out-of-order execution sequences. IBM Technical Disclosure Bulletin entitled Processor Performance Monitoring with Depiction of the Efficiency of Bus Utilization and Memory Accesses of Superscalar Microprocessor (Vol. 40 No. 01 January 1997) discloses an approach to analyzing whether the bus unit between the processor and storage has enough capacity to feed the processor efficiently. All of these prior publications gather instrumentation data and count occurrences of predefined events. However, none of them address the ability to capture data necessary to debug complex problems, since they are limited to the specific events that they are designed to monitor.

We note that there have been programmable event monitors such as U.S. Pat. No. 5,355,484 and in particular U.S. Pat. No. 5,237,684 (issued to Record et al.) which describes a software (operating system) event monitor and handler. In addition, U.S. Pat. No. 5,426,741 (issued to Butts et al.) monitors and counts events that are programmable via field programmable gate arrays. However, programming events is inadequate, and in our view there is a need for trace and debug capability, and real time direct access to the hardware.

U.S. Pat. No. 5,210,862 (issued to DeAngelis et al.) describes a way to monitor with hardware and for capturing debug data; however, the implementation relies on using addressable arrays to hold the target event being watched for. In large systems such as S/390 Enterprise Servers, typical fields to monitor such as addresses, commands, etc. are large and abundant. Therefore, any attempt to use the teachings of U.S. Pat. No. 5,219,0862 would require very large arrays. These are costly to implement since they must meet strict access times and incorporate Array Built-In Self Test (ABIST) structures for reliability. Furthermore, the patented idea is not well suited to monitoring multistage pipelines or complex event scenarios which require a more sophisticated controller for the trace array.

SUMMARY OF THE INVENTION

Our invention provides a way to flexibly monitor complex events in deep sub-micron systems, such as S/390 pipelined shared cache storage controllers.

Our way of monitoring hardware events in a computer system, implements a hardware event monitor of control registers and having generic fields which can be internally or externally programmed for monitoring events ranging from simple operations to complex event sequences. Using programmed criteria incorporated into said hardware event monitor to monitor events within said computer system by successive comparisons of programmed criteria with processing events allows us to use the monitored events to trigger external actions upon successful detection of compares indicating that all criteria programmed into the hardware event monitor have been achieved.

These and other improvements are set forth in the following detailed description. For a better understanding of the invention with advantages and features, refer to the description and to the drawings.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Overview

Turning now to our invention in greater detail, it will be seen from FIG. 1 which illustrates our preferred embodiment of our storage controller which is a part of the programmable hardware for monitoring complex events in a computer system and for triggering a desired hardware action such as data gathering. The preferred embodiment is incorporated into an Symmetric Multiprocessing System comprising a plurality of Central Processors, each having a private L1 cache, a plurality of I/O Adapters, and a main memory wherein any Processor or I/O Adapter can access any portion of the memory.

The Storage Controller provides access to a shared second level cache, various controllers, and discrete interfaces (or ports) to every Processor, I/O Adapter, and the main memory. The cache represented in the present embodiment is comprised of a plurality of banks or interleaves and the contents are managed by an 8-way associative directory.

Figure 1A:
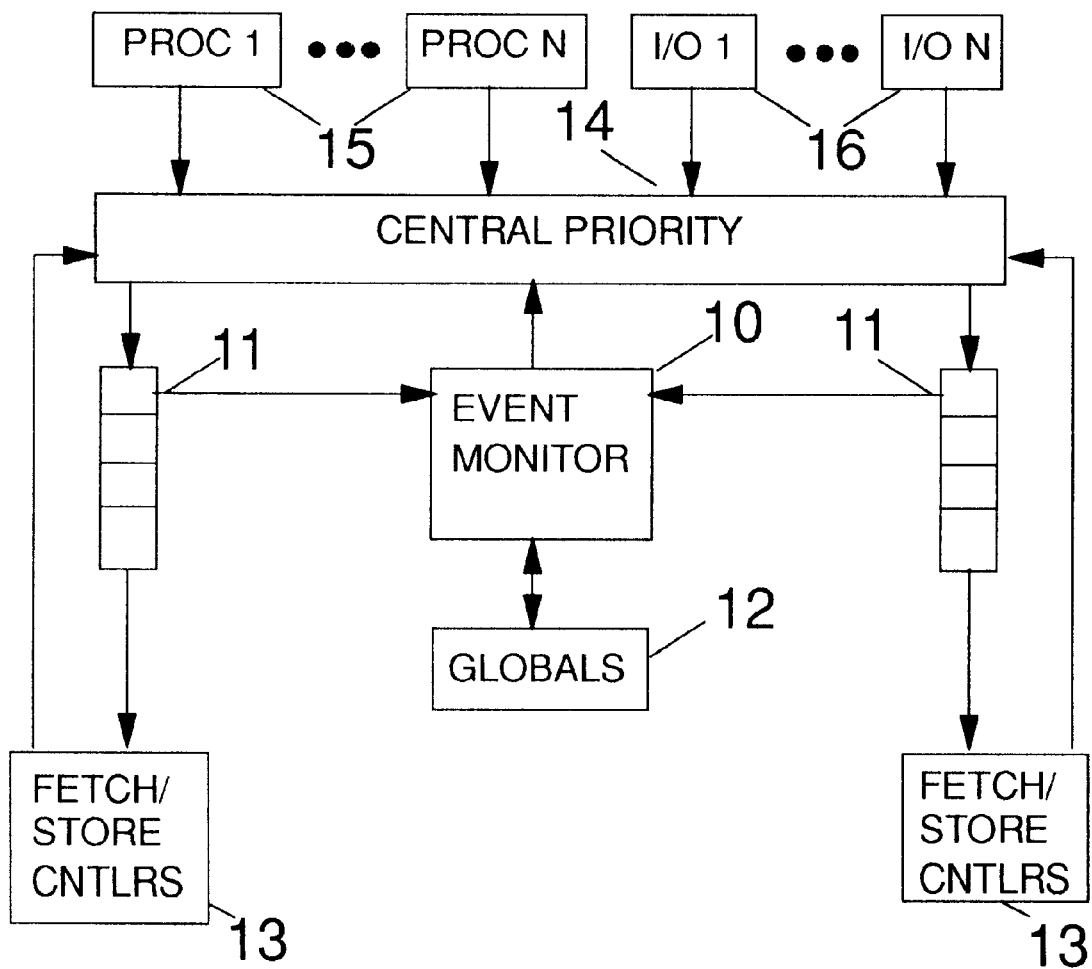
FIG. 1A illustrates the major functional elements of our storage controller.

The Storage Controller depicted in FIG. 1A illustrates the major functional elements and will be described further in the detailed description of the preferred embodiment.

The primary function of the Storage Controller is to process data fetch and store requests to and from main memory from the Processors and I/O Adapters. Since the Storage Controller contains or provides access to a shared second level cache, which is architecturally invisible to the software and operating system, the Storage Controller is responsible for performing directory and cache accesses. All incoming requests enter a port on the Storage Controller, where they are received by a Central Processor (CFAR) or I/O Controller. These controllers generate requests into a Central Priority unit which arbitrates among them and chooses one of the requesters to enter into one of two multistage Pipelines based on the address. During each stage of the pipeline the requester accesses and/or reserves various resources such as the cache, the Local Cache Fetch/Store Controllers, the data path controls, data path fifo buffers, the Remote Cache Fetch/Store Controllers, and other system resources.

As requests exit the pipeline, one of the Local Fetch/Store Controllers assumes responsibility for managing the operation through completion. Often this requires additional passes through the pipeline, therefore a Local Fetch/Store Controller must also participate in Central Priority arbitration, and is also considered a requester. In the present embodiment, the Cache Controller and the Main Memory Controller, are part of the Local Fetch/Store Controllers. Between them they contain all the resources (including data path elements such as fifo buffers and cross point switches) necessary to access data from the cache interleaves, process data accesses to main memory when cache misses occur, perform store operations into the cache interleaves, and cast out aged data (using a Least Recently Used method) from the cache into main memory in order to make room for incoming data from main memory accesses.

Communication between the Storage Controller and the outside world is also possible through the Microcode Bus or UBUS. This conduit permits the Processor Microcode (firmware) to send special read and write commands to the Storage Controller. Each of these commands has an accompanying UBUS Address which corresponds to one of a plurality of UBUS registers located within the Storage Controller. The read commands allow the current contents of a UBUS register to be accessed via the Processor Microcode and eventually forwarded to the Operating System or Operator's system console. Likewise, the write operations allow the contents of a UBUS registers to be modified by Processor Microcode.

In addition to governing the various regular system functions of the Storage Controller, UBUS addressable registers also control the sophisticated Trace Arrays and Instrumentation Counters contained within the Storage Controller. The Instrumentation Counters count occurrences of Storage Controller events (such as the number of data fetches that hit the Level 2 Cache) and log this data out for use in analyzing system performance. These counters can be controlled in our preferred embodiment to thereby achieve a high degree of programmability in the type of data being sampled.

The Trace Arrays provide several operational modes. In one mode, the trace captures information about the state of the machine on each clock cycle. This information is stored in arrays capable of holding 128 cycles worth of debugging data. The trace arrays will run continuously until some event stops them. The most common condition is for the trace to stop recording if a hardware error is detected in the Storage Controller. However, the controls are also capable of starting or stopping the tracing using other triggers such as a valid request entering the execution pipeline, an element (such as a Processor) successfully executing a recovery operation, or a compare against a hardware event using the present invention.

The trace controls are also capable of more advanced behavior such as stopping a precise number of cycles after one of the aforementioned events has occurred. This stoppage upon using our monitor permits an advanced level of debug capability. Additionally, the trace controls can also be disconnected from the actual trace arrays (SRAMs) holding the captured data. The stoppage allows the trace controls to act in concert with our monitor for purposes of detecting a hardware event, while permitting the data in the trace arrays to remain undisturbed.

Finally, the Storage Controller described herein permits two modes of trace gathering known as Local and Global Trace. Local Trace simply means the trace arrays in the Storage Controller operate independently of any other elements in the computer system such as the Processors, Main Memory and I/O. The Storage Controller trace arrays can stop and start under their own control without any regard to the other trace arrays in the system. In Global Trace Mode, all the trace arrays in the system are logically unified such that when one trace array (deemed the "master") begins tracing, all the other arrays begin. Conversely, when the master stops tracing, the other trace arrays follow suit. This permits an data to be captured for an event on a system-wide basis.

The preferred embodiment used for monitoring with our design described herein employs several new techniques to perform sophisticated compare operations against events being processed in the pipeline. Although our embodiment assumes a multistage pipeline, these concepts can be equally imparted on a single staged pipeline, or any design which contains a collection of fields that need to be monitored in various combinations. In addition to the design of the comparator itself, we provide for several applications in which the comparator interacts with other functions within an SMP Storage Controller to trigger actions based on successful interception of desired system events.

The use of programmable fields permits a wide variety of compare operations to be performed. In addition, the event monitor itself can be very tightly integrated with a discrete function known as hardware trace which normally runs in an independent fashion, but when coupled to the event monitor provides a way for addressing several types of applications. The programmable field concept in our preferred embodiment will be described in detail in terms of typical fields found in a shared L2 cache pipeline, such as Command, Requestor ID, Address, Compartment, and the like. It should be noted, however, that these fields serve as examples of the embodiment, and could easily be replaced with other fields related to a shared cache design or fields related to microprocessors such as GPRs, instruction op code, address, translation mode, etc.

In addition, our embodiment assumes a four stage pipeline, but that is also arbitrary as these concepts can be employed against any number of stages.

Although at the highest conceptual level, our comparator is like any other in that it seeks to match a desired value against an actual value, inspection of the detailed design reveals several novel features which improve the usefulness of the device. To begin with, all of the fields in our comparator can be programmed via the UBUS which is a communication protocol that permits the Processor microcode to interface with environmental registers that control the Event Monitor and Hardware Trace. This not only makes the comparator more versatile, but allows hand loops to be used to monitor or trigger events. In addition, the comparator can run in several different modes, all of which are controllable via the UBUS. Finally, since the UBUS registers are also scan-enabled, system scanning can also be used to set up a pipe compare operation.

The programmable fields provide a mask/value register pair on every field whereby a "1" in a mask bit position means the corresponding bit in the value register must match the corresponding bit in the pipe field. On the other hand a "0" in a mask bit position implies a "wildcard", which means this bit position can be ignored in the compare. An example of the concept would be a 6-bit pipe command field where the value is programmed to 0x20 while the mask is programmed to 0x30. Since the last nibble of the mask is "0", only the first 2 bits of the value must compare against the actual pipe command. Thus, any pipe command in the 0x2* range will cause a compare. A mask field of all zeros implies that the entire field doesn't participate in the compare. Once again both the mask and value registers are programmable via the UBUS, thus permitting a vast combinations of fields to be employed in monitoring operation.

In addition to the mask and value registers, each multi-bit field also contains a control bit which dictates whether the compare will be normal or "inverted". An inverted compare succeeds when the field's value register does NOT match the corresponding pipe field. Recalling that the field mask can be employed for wildcarding, the following hypothetical example demonstrates how one can use our invention to monitor for all 0x0* commands (ie. data fetches) from requestor_id 0x01 (ie. Processor 1) for all addresses above the first 64k of storage. This is accomplished by setting the command value register to 0x00, the command mask register to 0xF0, the requestor_id value to 0x01, the requestor_id mask to 0xFF, the address value to 0x00000000, the address mask to 0xFFFF0000 and turning on the Field Invert Bit for the address field. Without the presence of the Field Invert Bit, the result would be a compare for all 0x0* commands for Processor 1 which access the first 64k addresses.

Another feature provided is our Boolean Control Bit . wherein field compares can operate in an AND fashion or an OR fashion. For example, a compare can be set up to look for a Mode 0x02 pass of a 0x03 command, which implies the Mode and Command fields must both compare for an overall compare to succeed. On the other hand, flipping the boolean bit would result in a compare if either a 0x03 command occurred in any Mode, or a Mode 0x02 pass occurred for any command. One possible application of the "OR" mode might be monitoring events such as cache updates which can occur two different ways in the preferred embodiment: the Memory Controller can make a Mode 0x04 pipeline pass or a Processor can issue a Store Into L2 The desired event can be monitored by setting the Mode field to a value of 0x04 with a corresponding mask of 0xFF, then setting the command field to a value of 0b1010**, with a mask of 0b111100 (since there are a plurality of Store Into L2 op codes in this range), and finally setting the boolean bit which implies the "OR" mode.

With our preferred embodiment's dual multistage pipelines, every field comparator is replicated for both pipelines, and two control bits determine if Pipe A, Pipe B or both pipes should participate in the overall compare. This allows events to be monitored in a particular pipe or across both pipes. In addition, since there are four stages in the aforementioned pipeline, our invention provides a control bit for each stage, which allows the compare to be reported during the C1, C2, C3 and/or C4 pipeline cycle. Any combination of the four control bits can be used to construct multiple compares for a single logical operation. Furthermore, each stage has a "valid" mask bit. If the mask bit is active then the corresponding pipe cycle must be valid. To further reduce the gate count, our invention performs all compares on the C1 cycle, and then pipelines the compare into three subsequent staging registers for potential C2, C3 and C4 compares. This can be useful in filtering out, or trapping, rejected or retired pipe operations.

It's not uncommon to find computer designs that multiplex several types of information in the same register or field. For example, the preferred embodiment uses a common address field to house absolute addresses, physical addresses, and data unrelated to addresses. With our Programmable Field Types control bits are used to program the compare logic for that field. Depending on the setting of these bits, the field compare of the preferred embodiment will decode the corresponding command to ensure the address is of the desired type. Thus the pipe address field must match the desired value and the address must be of the correct type for a compare to succeed.

Our Event Monitor has two underlying compare stations in which a single functional block provides control bits, mask/value registers, field comparators, compare accumulators and final report generators, for each station which is replicated in its entirety. The two stations can then act as independent comparators since each receives its own copy of both pipelines and drives its own compare output signal. In one mode each compare station can be programmed individually to monitor separate events. In an alternate mode, each compare station contains two control bits which can be used to chain the stations together to monitor a sequence of events. The two bits control whether Station X should be enabled or disabled when Station Y compares (or vice versa). For example, Station X can be set up to monitor for Processor data fetches and initialized in an active state. Station Y can be set up to monitor an I/O Store, and initialized in a disabled state with the control bit set to activate Station Y when Station X compares. The end result would be a successful compare from Station Y once a sequence occurred involving a Processor data fetch followed by an I/O Store.

The present embodiment employs a universal compare counter which services both compare stations. However, an alternate embodiment would envision dedicated counters for each station. In either case, the concept is identical. Two control bits exist to enable or disable the compare station whenever N compare events has occurred. A compare event is defined as any event in which the desired values (taking into account the field mask and invert bits) match the corresponding fields of the selected pipes with regard to any programmable field types, the pipe stage mask and pipe stage valid bits. This feature allows one to begin compares on the nth occurrence of a particular event, or to stop comparing after the nth occurrence of an event.

System Applications Involving Interaction with Other Functions

We will describe various interactions that exist in the preferred embodiment between the Event Monitor and external functional units. These system applications of the comparator demonstrate how several types of problems may be addressed. It will be appreciated by one skilled in the art that this description serves to illustrate examples of possible applications of our invention, and is not to be a restricted description of any particular embodiment which may be employed.

The single most powerful application of the Event Monitor is its interaction with the Hardware Trace function. Although the concept of capturing and logging events with the aid of hardware storage devices is not new, the preferred embodiment utilizes an advanced Hardware Trace function which has been described in prior art as a stand-alone independent function. This function consists of a controller which governs when to start and stop data gathering, and one or more arrays which store the data. The data feeding the trace arrays consists of a predetermined set of signals which together describe the state of the adjoining functional blocks. Typically a large system, such as the S/390 Large Servers, employ trace functions in each Processor, Storage Controller, and several I/O functions. The size of the trace arrays varies depending on the system, but can usually accommodate a minimum of 128 cycles of data.

Prior to this disclosure, the trace arrays were typically governed by a predetermined set of events which were hard-wired into the design. For example, the trace controller might stop recording data if it detected a hardware error checker, a Processor entering recovery, a compare on a certain address, etc. In addition, the controller would capture data for 1 to 128 cycles then automatically shut down until the next event. Conversely, the trace array could be set to constantly capture data then shut down N cycles after an event occurred. These features are of great assistance when the problem at hand lends itself to one of the predefined scenarios. However, in unanticipated situations, the prior art is at the disadvantage of not being able to capture the data necessary to produce the desired result. A typical example illustrating this shortcoming is the ability to isolate a single logical operation executing in a shared L2 cache pipeline which terminates with an error. This operation may involve several asynchronous pipe passes which may not fit within a 128 cycle window. Thus, the aforementioned trace controller is limited to capturing the 128 cycles adjacent to the error, which may not contain enough pipe passes to resolve the cause of the error.

Since the Hardware Trace function contains useful controls to start and stop data gathering when certain system events occur, our invention permits the Event Monitor to act as an extension to the trace controls. By providing a means for extending the trace controls, it eliminates the need to duplicate the trace controls within the Event Monitor yet also permits the trace controls to act as an independent function without relying on the Event Monitor. This extension occurs in one of two ways. Either the trace controls can act as the "master" and, upon detecting one of the predefined system events (such as a Processor entering recovery), can interact with the Event Monitor to enable pipe compares when the trace starts or stops, or it can disable compares when the trace starts or stops. Conversely, the trace controls can be configured as the "slave" whereby the Event Monitor arms the trace controls to begin or cease monitoring a system event after the desired compare occurs.

As stated above, one of the most useful applications of the tight interaction between the Hardware Trace and Event Monitor is gathering data for logical operations. The trace controls contain a delay by n cycles feature such that once the trace begins, it will trace n cycles then automatically stop, until it's armed again. The close interaction between the pipe comparator and the trace controls allows for two useful applications. In the first, the pipe compare would trigger the trace to capture n consecutive cycles, and then disable the compare station. This is useful in situations where the problem lies in close proximity to a particular event which would be difficult to detect using the predefined event triggers embedded in the base trace controls. For example, a particular Processor performing a specific operation within a desired address range. The other application involves chaining the comparator and trace controls such that each compare will cause the trace to capture 1 or 2 cycles of data, then pause until the next compare. This type of scenario can be very helpful in debugging pipe sequences or state machines. For example, the comparator could be programmed to monitor all modes (which are a type of state machine) of a particular address, command and requestor id (ie. Processor A doing a read-only fetch from address 0x00432987). Every time this event made a pipe pass, the trace would capture n cycles of pertinent data (such as needs, rejects, mode, etc.). The end result would be trace data pertaining only to the desired event which would show the mode sequence comprising that logical operation.

We provide for two other trace control signals which are visible to the Event Monitor as part of the tight interaction. The first signal simply indicates whether the trace is currently running or idle. Although this isn't a pipeline field, our preferred embodiment treats this as though it were a field by implementing corresponding mask and value bits. As with all the other fields, a mask of "1" indicates that the value bit must match the trace running signal for a compare to occur. This can be useful in situations where one wishes to specifically compare events or to intentionally prevent compares when the trace is active. A special mask and value bit exist in the control register which serve as an additional field compare. However, rather than comparing against a pipe field, the value bit is compared against a signal from the trace controls which indicate that the trace is active.

The trace controls can also detect when a Processor has a pending request into the pipeline. This signal is further provided to the Event Monitor to allow for tracing a particular event (such as Processor A doing a read-only fetch from address 0x0432987) but capture the data only if another Processor is pending for the same line. Since many of the problems found in shared caches of SMP systems involve interaction between one or more requesters, a simple comparator can't discern whether the event passes through the pipe with or without interaction with other requesters. In prior implementations, this often required a hit or miss approach in hopes of capturing the correct trace snapshot.

The Event Monitor not only extends to the local trace controls, but also to the global trace controls. This permits the pipe comparator to govern a system-wide trace of an event, which can be particularly useful if the event needs to be tracked across multiple elements. For instance, a compare can be set up to trigger a synchronized trace of a Processor fetch, whereby data is gathered in the Processor's trace array as well as the L2's trace.

Since IML (or power on) sequences are lengthy and can cause many false or unwanted compares, a special control bit exists in the Event Monitor which allows the comparator to be programmed and initialized in an inactive state. Once system IML completes, the comparator will automatically activate and begin monitoring the pipe fields.

Since the instrumentation logic often contains very large counters, which are accessible via firmware, we allow the pipe comparator to expand the capabilities of the instrumentation function. For example, the instrumentation controls can be governed by the comparator to sample very specific events. This enables two useful applications. In the first, the instrumentation counters are used to remember if a specific event ever occurred. This may be desirable in situations where one wants to know if a particular event or sequence of events can occur while running a workload. The other application is counting the occurrences of a specific event, or sequence of events. This can be very useful for monitoring the performance of events not typically covered by regular instrumentation sampling. For example, two different workloads can be run to compare how often each one encounters cross invalidations. The combination of the dual compare station, advanced masking features, and close interaction with the trace controls, allow for the instrumentation logic to monitor very complex scenarios.

Although past designs have included address compare functions which were capable of triggering a hardware error injection, our invention improves on previous capabilities. For example, the IML switch can be used to prevent unwanted compares during system IML, which, in turn, prevents unwanted error injects before the system is properly initialized. In addition, the dual compare stations, the advanced masking capabilities and the trace controls can be used in various fashions to precisely control when the error injection should occur. Not only does this eliminate problems caused by errant injections, but it also enables more accurate recovery testing by allowing injection on very specific events.

One of the most difficult problems to resolve in SMP systems is deadlocks caused by synchronous loops of requesters unable to progress through an operation because each is contending for a resource held by the other. Our invention permits the pipe compare to trigger various dither actions intended to break potential deadlocks. These actions include serialization of Processor fetches, stores or other operations upon detection of a particular event. It can also trigger slow mode where a single requestor is monitored and upon entering the pipe is permitted to completely finish the operation before a new requestor can enter.

By ANDing the compare output signals from the two Compare Stations, one can construct a "super comparator". This could be useful if one wants to monitor for an event which involved both ANDing and ORing of the fields. For example, Station X could be set up to monitor for Processor data fetches (pipe command=0b000xxx and requestor_id= 0b00xxx) while Station Y could be set up to monitor for addresses within a certain line or compartment A. The end result of ANDing the outputs would be a successful compare on any Processor fetch to the desired line or the desired cache compartment.

Finally an advanced field filter can be constructed by ANDing the compare output signals from one station with the compare output from the other station. This assists in solving the problem that arises when the existing wildcard capability within a field is insufficient. For instance, if one wants to trigger an action anytime a three bit field matches '000', '001' and '010' but NOT '011' or higher ('1xx'). This case can't be handled solely with the three bit mask field since the mask bits must be '100' to get three of the desired values. Unfortunately, the fourth undesired value of '011' will also cause a compare. However, the second compare station can be programmed to a value of '011' with a mask of '111' and the field invert bit set to '1'. The first compare station will fire for all four lower values, whereas the second compare station will fire for the three desired lower values plus the '1xx' values. The "AND", or intersection, of the two solution sets yields the desired compare action of triggering only on '000', '001' or '010'.

Here we can recognize powerful advantages achieved by providing a way for all the aforementioned scenarios to be applied via external communication. Unlike some prior art systems which necessitate hard wiring the target events or using mildly flexible means such as Field Programmable Gate Arrays, we use UBUS Control Registers accessible and programmable via Processor Microcode. This enables programmers to employ microcode patches to set up the desired event monitoring, and access the resulting debugging or performance data. Although our preferred embodiment relies on a microcode update as the only means for programming and accessing the Hardware Event Monitor while the system clocks are running, one can envision alternate embodiments which extend this concept to allow application software to trigger these same actions.

Furthermore, our invention lends itself to various applications involving remote problem determination and system analysis since technology such as telephone dial-up connections, the internet, and Local or Wide Area Network connections can be used to download or deliver the instructions necessary to program the UBUS registers which control the event monitoring. Several products exist in the marketplace today which enable Information Systems Administrators, in a centralized location, to remotely monitor and access information about a personal computer, workstation, or terminal on the network. However, these products are typically limited in the scope of information they can collect. Coupling these products with the present invention would expand their debugging capabilities to handle the sophisticated and complex problems often found in large enterprise systems.

After understanding our preferred embodiment, one skilled in the art will appreciate that the concepts disclosed herein are applicable to systems comprising alternate Storage Controller embodiments with a different number and configuration of functional units, including, but not limited to, the cache structure, the main memory organization, the number and size of data path resources (such as buffers, control busses, etc.), the composition of the various controllers, and the number and size of the Pipelines. Additionally, our invention contemplates an embodiment other than a Storage Controller, such as a microprocessor, I/O controller, network adapter, bus arbiter, or any other hardware device containing information which can be construed as fields and is considered to be desirable to monitor in order to trigger further actions.

DETAILED DESCRIPTION OF THE PREFERRED EMBODIMENT

The present invention employs several concepts which improve upon the prior art in the area of monitoring events occurring in a computer system, and gathering information related to said events. This disclosure presents the invention in the spirit of the preferred embodiment which is centered around an SMP Storage Controller containing a shared L2 cache pipeline. However, one skilled in the art will appreciate that the methods and apparatus disclosed herein are applicable to a plurality of embodiments pertaining to virtually all areas found in a typical computer system.

FIG. 1A depicts a high level block diagram of the preferred embodiment. Each block represents a major functional unit comprising an SMP Storage Controller found in a large system such as the S/390 Enterprise Servers. Our invention is represented by the Event Monitor (10) which interacts with two identical Multistage Pipelines (11), a Global functional unit (12) and the main Central Priority (14) function. Work requests such as fetches, stores, and broadcast operations enter the Storage Controller into one of the Processor Controllers (15) or one of the I/O Controllers (16). There is one of each of these controllers to represent each Central Processor and I/O Adapter in the symmetric multiprocessing system. These work requests are forwarded to the Central Priority station (14) where they compete for priority to enter one of the two Pipelines (11). As the work requests are processed through the various stages of the Pipelines (11), they eventually exit the pipe and are picked up by one of the Fetch or Store Controllers (13) which are responsible for managing the operations such as L3 memory accesses, LRU Cast Outs, Storage Protect Key operations, etc.

The Event Monitor (10) receives input from the first stage of both Pipelines (11) as well as the Global functions (12). These Global functions include things like Performance Instrumentation, and Hardware Error Injection, the Microcode Bus (UBUS) Controller, etc. Upon detecting the desired event, the Event Monitor (10) broadcasts signals indicating a successful compare to the Instrumentation, Hardware Error Injection logic within the Globals (12) as well as the Central Priority logic (14). Once again it should be noted that our invention can be incorporated into alternate system embodiments. For example, the surrounding components in FIG. 1A could be replaced with those in a microprocessor which lend themselves to monitoring, such as fixed point or floating point execution pipelines, General Purpose Registers, Address Translators, PSWs, Instruction Pre-fetch and Decode Units, Memory Management Units, etc. Alternatively, the illustration could depict a Memory or I/O Subsystem which may be monitoring system busses, fifo buffers, data cross point switches, bus arbiters, configuration controllers, address translators, diagnostic and test functions, packet controllers, etc. Virtually anything that can be monitored lends itself to the techniques employed throughout this disclosure.

Figure 1B:
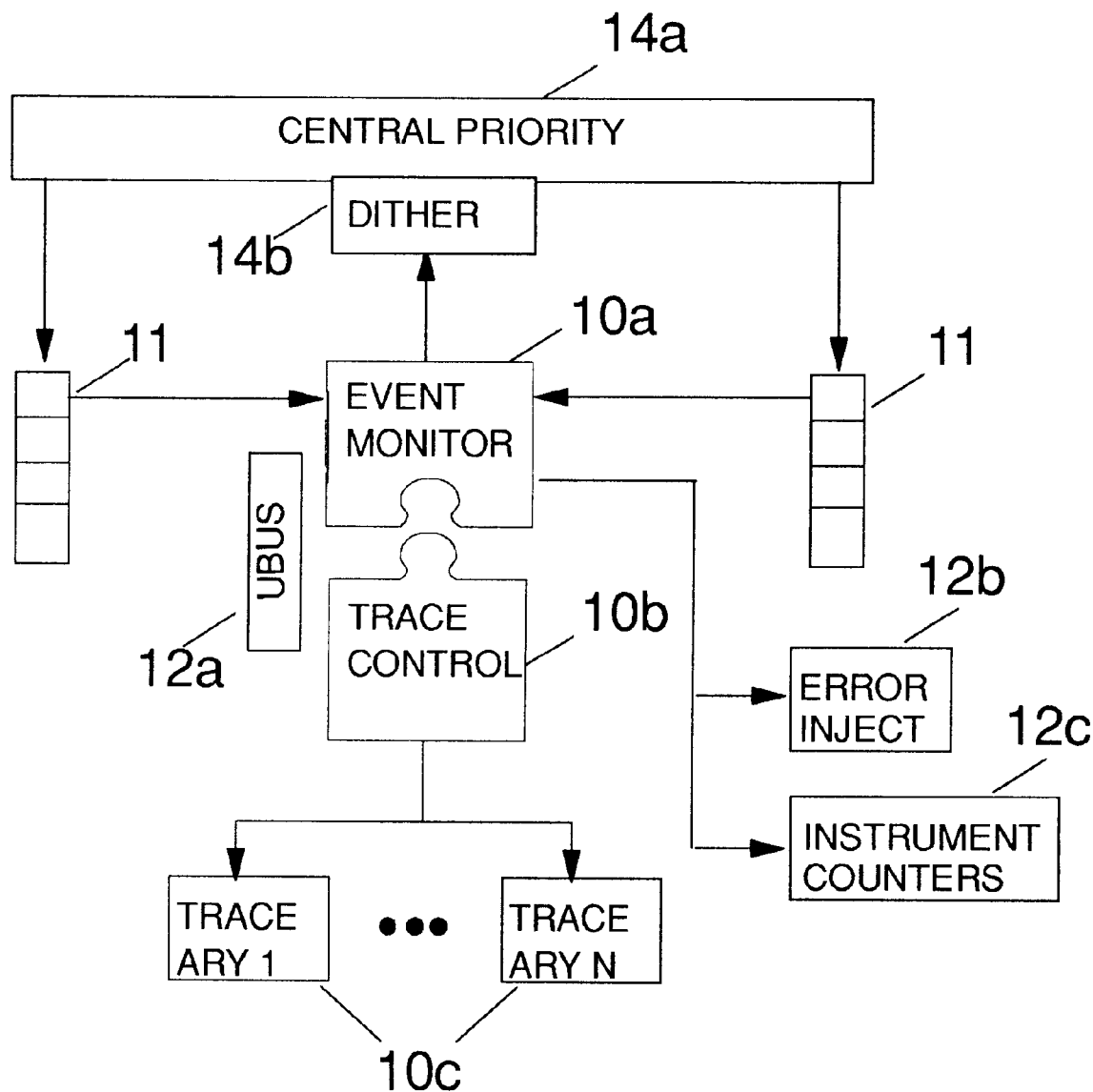
FIG. 1B illustrates the Event Monitor which is expanded to illustrate the two primary components which are the Comparator (10a) and the Trace Controls (10b).

Turning our attention to FIG. 1B, the Event Monitor is expanded to illustrate the two primary components which are the Comparator (10a) and the Trace Controls (10b). The illustration depicts the relationship between these components using jigsaw puzzle pieces to imply that they can be "connected" together to form a cohesive logical function, or they can function as separate disjoint entities. The Trace Controls (10b) manage one or more Trace Arrays (10c) which are typically simple SRAMs used for gathering event data.

Additionally, the drawing shows the expansion of the Globals into the primary units that interact with the Event Monitor (10). These include the Microcode Bus (UBUS) Controller (12a) which is responsible for handling all communication between the Storage Controller and the Central Processor via commands which can be initiated via Processor Microcode (UCode). The UBUS interacts with the Comparator (10a) and Trace Controls (10b) to permit various control registers to be programmed in a very flexible manner. As previously stated, the Globals also contain the Hardware Error Injection unit (12b) which permits parity errors to be injected into predefined hardware function as well as correctable (CE) and uncorrectable (UE) data to be injected into various arrays. The primary purpose of this function is to instill hardware errors in order to test recovery operations. Lastly, the Globals contain the Instrumentation function which is responsible for gathering data used in analyzing system performance.

The final functional block introduced in FIG. 1B is the Dither function (14b) which is an extension of Central Priority (14a). Large Symmetric Multiprocessing Systems contain numerous resources which must be shared between many requestors. Occasionally a plurality of requesters engage in a synchronous loop whereby each is contending for a resource held by the other. The synchronous nature of the loop results in an infinite deadlock unless the loop can be broken. Upon detecting these loops, the Dither function (14b) temporarily blocks requesters from entering the pipelines, thus allowing operations to complete and free up resources.

Figure 2:
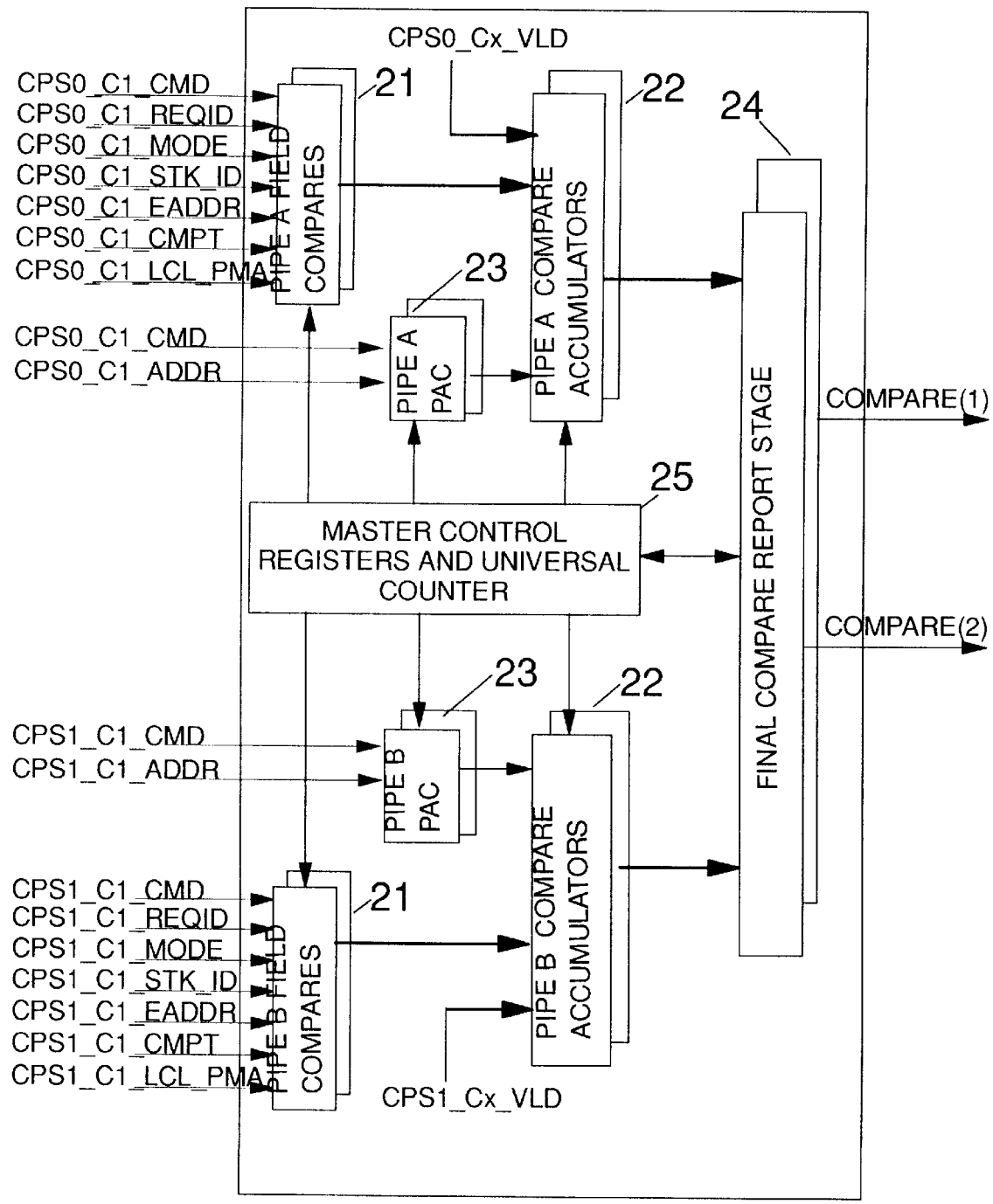
FIG. 2 shows the underlying functions of the Comparator (10a).

Turning our attention to FIG. 2, we see the underlying functions of the Comparator (10a). Three of these functions are replicated for each pipeline in the system. The final results are forwarded to a common report unit which generates the overall compare signals. The entire Comparator (10a) is governed by a single block containing all the master controls. Beginning with the upper left corner of FIG. 2, the pipeline fields available in our preferred embodiment are monitored by the Field Compare Units (21). in our preferred embodiment, these fields include the Command, Requestor ID, Mode, Compartment, Store Stack ID, Local PMA bit, and Extended Address available in the C1 stage of the Pipeline (11). There is one Field Comparator for each input field. The results of each Field Comparator are forwarded to Compare Accumulators (22).

In addition to the regular Field Compare Units (21), our invention also employs a special field comparator depicted as a Programmable Address Comparator (23) which specifically handles the Absolute Address. In the preferred embodiment, the Absolute Address field is used to multiplex several types of data such as an Absolute Address, a Physical Address and non-address data. The context of this field is determined by the accompanying Command. The Programmable Address Comparator decodes the Command to determine whether the Absolute Address field contains the desired type of data. It then performs a compare in a similar fashion to the regular Field Comparators (21). One skilled in the art would appreciate the plethora of possible implementation variants on this aspect. For instance, it is common for microprocessor designs to multiplex several types of information into a single register or "field". Our invention does not restrict the Programmable Field Type concept to an address field. Furthermore, although our preferred embodiment depicts the use of a command decoder to resolve the context of the field, our invention also contemplates other means such as additional dedicated bits within the field to denote the type of information, additional bits in a different field, a field dedicated entirely to describing the type of information, or any other manner by which the type of information can be conveyed and used for comparison against the target bits in the Master Control Register.

Upon assembling the field compares into overall compare signals for each pipeline stage, the Compare Accumulators

(22) forward this information to the Final Compare Report Station (24). There is a single Final Report station which collects the staged compares for each pipeline and assembles an overall compare signal to be distributed externally.

As stated above, the Field Comparators (21), Programmable Address Comparator (23) and Compare Accumulators (22) are all replicated for each pipe. In addition to replicating the pipe specific functions, our invention also duplicates all of the aforementioned units to create dual compare stations known throughout this disclosure as Station X and Station Y. Since all pipe fields are visible to both Stations, each one can be individually programmed or they can be chained together to act as a single comparator. Finally, all of the functions in both stations are governed by a common Master Controller and Universal Counter (25) which interfaces with the UBUS (12a).

Figure 3A:
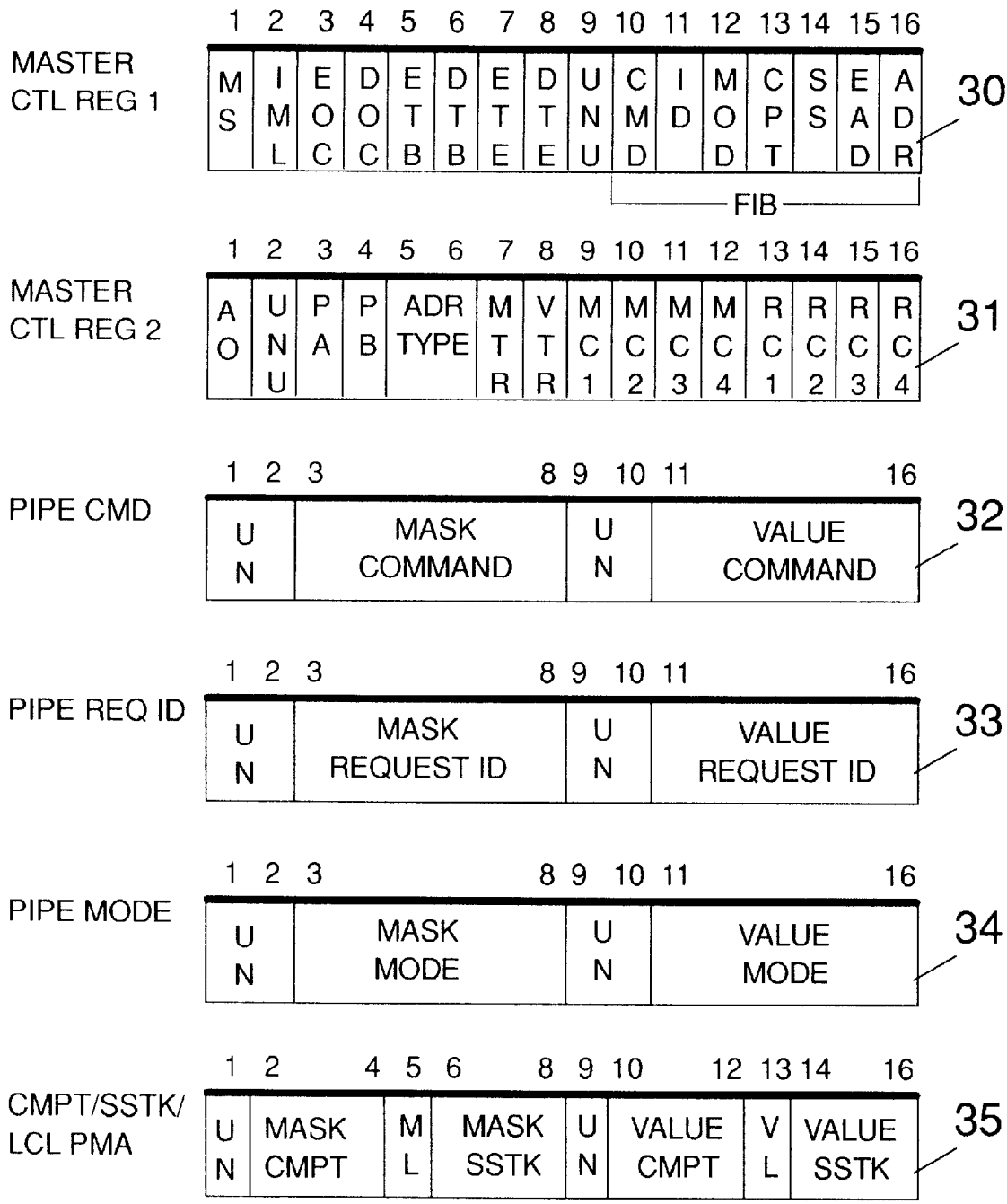
FIGS. 3A and 3B illustrate the various control registers comprising the Master Controller (25).
Figure 3B:
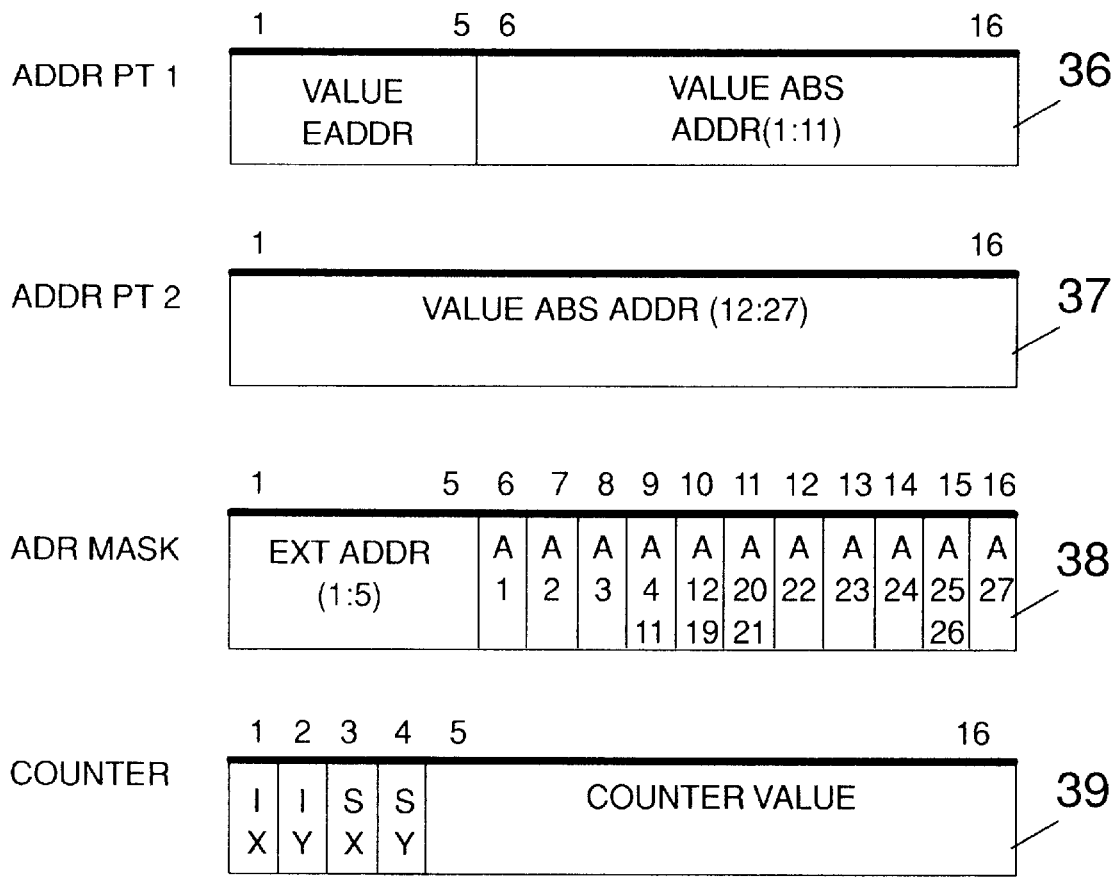

FIGS. 3A and 3B illustrate the various control registers comprising the Master Controller (25). Every one of these registers is addressable via the UBUS (12a) which permits all of them to be "programmed" using commands issued through microcode while the system clocks are running, or through the use of Level Sensitive Scan Design (LSSD) as part of resetting and initializing the system. In addition to the ability to program the various masks and field values, four bytes of control information can be programmed as well. Although not shown in FIGS. 3A and 3B, each register, with the exception of the Counter (38), is duplicated for Station X and Station Y. The registers illustrated in the figure are actually those controlling Station X, but it should be noted that an identical set exists for controlling Station Y. Once again, the preferred embodiment shares the Counter (38) across both stations, but one skilled in the art could envision an embodiment whereby this register is also duplicated and dedicated to each station.

The Master Control Register Part 1 (30) and Master Control Register Part 2 (31) contain all the control bits used to program the behavior of the Comparator (10a). The majority of the registers are the field registers which contain the desired mask and value against which the pipe fields must compare. They are grouped into a series of 16 bit registers in order to comply with the UBUS architecture. Even though they are physically grouped in the manner described, one can think of each mask/value pair as a logical entity in itself. The Counter (38) consists of four control bits with a 12 bit counter. The description of the bits comprising each register follows:

Master Control Register 1 (30)

Bit 1 Master Switch (MS) The master enable/disable for the entire station. This bit MUST be on for any compare to take place.

Bit 2 IML Switch (IML) This switch enables the compare station when system IML is complete. This way, compare events caused by the IML sequence can be prevented from triggering undesired actions such as launching a hardware error injection before IML is complete.

Bit 3 Enable When Other Compare Occurs (EOC) This bit can be used to chain the two compare stations together to form a domino-like compare. For example, if this bit is set in Station X, then once the event programmed in Station Y occurs, Station X will automatically enable itself to begin monitoring for it's programmed event. This can be very useful if one wants to detect a particular event, but only after a previous event occurred.

Bit 4 Disable When Other Compare Occurs (DOC) The opposite of Bit 3, this will cause the compare station to shut down when the other compare station reports its compare. This can be useful if one wants to stop monitoring for a particular event once a second event has occurred.

Bit 5 Enable When Trace Begins (ETB) This bit activates the compare station once the trace array begins to record events.

Bit 6 Disable When Trace Begins (DTB) This bit shuts down the compare station once the trace array begins to record events.

Bit 7 Enable When Trace Ends (ETE) This bit activates the compare station once the trace array stops recording events.

Bit 8 Disable When Trace Ends (DTE) This bit shuts down the compare station once the trace array stops recording events.

Bit 9 Unused (UNU) Currently Unused

Bit 10 Pipe Command Field Invert Bit (CMD) A compare may occur if the Pipe Command Field does NOT match the mask and value information in the Pipe Command Field (32).

Bit 11 Pipe Requestor ID Field Invert Bit (ID) A compare may occur if the Pipe Requestor ID Field does NOT match the mask and value information in the Pipe Requestor ID Field (33).

Bit 12 Pipe Mode Field Invert Bit (MOD) A compare may occur if the Pipe Mode Field does NOT match the mask and value information in the Pipe Mode Field (34).

Bit 13 Pipe Compartment Field Invert Bit (CPT) A compare may occur if the Pipe Compartment Field does NOT match the mask and value information in the Pipe Compartment Field (35).

Bit 14 Pipe Store Stack ID Field Invert Bit (SS) A compare may occur if the Pipe Store Stack ID Field does NOT match the mask and value information in the Pipe Store Stack ID Field (35).

Bit 15 Pipe Extended Address Field invert Bit (EAD) A compare may occur if the Pipe Extended Address bits do NOT match the mask and value information in the Pipe Extended Address Field (36).

Bit 16 Pipe Absolute Address Field Invert Bit (ADR) A compare may occur if the Pipe Absolute Address does NOT match the mask and value information in the Pipe Absolute Address Field (37).

Master Control Register 2 (31)

Bit 1 AND/OR Compare Type (AO) This switch (aka the "Boolean Bit") governs whether the pipe fields will use an AND or an OR style compare. With an AND style compare ALL fields with non-zero masks must compare in order to get an overall pipe compare. With an OR style compare, only one field with a non-zero mask needs to compare to get an overall pipe compare.

Bit 2 Unused Currently Unused

Bit 3 Pipe A Select (PA) If this bit is on, the Pipe A fields will be compared against the values and masks loaded in the set of control registers dedicated to Pipe A.

Bit 4 Pipe B Select (PB) If this bit is on, the Pipe B fields will be compared against the values and masks loaded in the set of control registers dedicated to Pipe B.

Bits 5:6 Programmable Address Type (ADR TYPE) These bits are decoded to perform additional filtering on the absolute address field compare. For example, the contents of the pipe absolute address can be either an absolute address, a physical address or data which doesn't pertain to an address. Thus, when it's desirable to set up a compare on a specific address type and value, these bits can be used to prevent an unwanted or false compares. The code points are as follows:

| | |
|---|---|
| 00 | Compare against any type of data in the address field |
| 01 | Compare against only absolute addresses |
| 10 | Compare against only physical addresses |
| 11 | Compare against "non-address" related data |

Bits 7:8 Mask/Value for Trace Running (MTR VTR) If this bit is on then the value in Bit 8 of this register MUST match the value of the trace running signal received from the Trace Array Controller. Otherwise, if this bit if off then this field is ignored in the overall compare.

Bit 9 Mask for Pipe C1 Valid (MC1) This bit indicates that the Pipe Operation MUST be valid in the C1 cycle in order to trigger a compare event.

Bit 10 Mask for Pipe C2 Valid (MC2) This bit indicates that the Pipe Operation MUST be valid in the C2 cycle in order to trigger a compare event.

Bit 11 Mask for Pipe C3 Valid (MC3) This bit indicates that the Pipe Operation MUST be valid in the C3 cycle in order to trigger a compare event.

Bit 12 Mask for Pipe C4 Valid (MC4) This bit indicates that the Pipe Operation MUST be valid in the C4 cycle in order to trigger a compare event.

Bit 13 Report the Compare on C1 (RC1) This bit indicates that the compare (if successful) will be reported on the Pipe C1 cycle.

Bit 14 Report the Compare on C2 (RC2) This bit indicates that the compare (if successful) will be reported on the Pipe C2 cycle.

Bit 15 Report the Compare on C3 (RC3) This bit indicates that the compare (if successful) will be reported on the Pipe C3 cycle.

Bit 16 Report the Compare on C4 (RC4) This bit indicates that the compare (if successful) will be reported on the Pipe C4 cycle.

Pipe Command Field (32)

Bits 1:2 Unused. These bits are currently unused

Bits 3:8 Command Mask (MASK CMD) For any bits which are set, those bit positions of the Value register must match the corresponding bits in the pipe Command field. If all bits are zero, this field is excluded from the overall compare.

Bits 9:10 Unused. These bits are currently unused

Bits 11:16 Command Value (VALUE CMD) The programmable value which will be compared against the pipe Command field.

Pipe Requestor ID Field (33)

Bits 1:3 Unused. These bits are currently unused

Bits 4:8 Requestor ID Mask (MASK REQ ID) For any bits which are set, those bit positions of the Value register must match the corresponding bits in the pipe Requestor ID field. If all bits are zero, this field is excluded from the overall compare.

Bits 9:11 Unused These bits are currently unused.

Bits 12:16 Requestor ID Value (VALUE REQ ID) The programmable value which will be compared against the pipe Requestor ID field. Pipe Mode Field (34)

Bits 1:3 Unused These bits are currently unused.

Bits 4:8 Mode Mask (MASK MODE) For any bits which are set, those bit positions of the Value register must match the corresponding bits in the pipe Mode field. If all bits are zero, this field is excluded from the overall compare.

Bits 9:11 Unused These bits are currently unused.

Bits 12:16 Mode Value (VALUE MODE) The programmable value which will be compared against the pipe Mode field.

Pipe Compartment/Store Stack/Local PMA Field (35)

Bit 1 Unused This bit is currently unused.

Bits 2:4 Compartment Mask (MASK CMPT) For any bits which are set, those bit positions of the Value register must match the corresponding bits in the pipe Compartment field. If all bits are zero, this field is excluded from the overall compare.

Bit 5 Local PMA Mask (ML) If set, the Local PMA Value bit must match the pipe Local PMA bit, otherwise this field is excluded from the overall compare.

Bits 6:8 Store Stack ID Mask (MASK SSTK) For any bits which are set, those bit positions of the Value register must match the corresponding bits in the pipe Store Stack ID field. If all bits are zero, this field is excluded from the overall compare.

Bit 9 Unused This bit is currently unused.

Bits 10:12 Compartment Value (VALUE CMPT) The programmable value which will be compared against the pipe Compartment field.

Bit 13 Local PMA Value (VL) The programmable value which will be compared against the pipe Local PMA field.

Bit 14:16 Store Stack ID Value (VALUE SSTK) The programmable value which will be compared against the pipe Store Stack ID.

Pipe Address Field Part 1 (36)

Bits 1:5 Extended Address Value (VALUE EADDR) The programmable value which will be compared against the pipe Extended Address field.

Bits 6:16 Address Value (VALUE ABS ADDR(1:11)) The programmable value which will be compared against the pipe Absolute Address bits (1:11).

Pipe Address Field Part 2 (37)

Bits 1:16 Address Value (VALUE ABS ADDR(12:27)) The programmable value which will be compared against the pipe Absolute Address bits (12:27).

Pipe Address Mask (38)

Bits 1:5 Extended Address Mask (EXT ADDR(1:5)) For any bits which are set, those bit positions of the Value register must match the corresponding bits in the pipe Extended Address field. If all bits are zero, this field is excluded from the overall compare.

Bit 6 Absolute Address Bit 1 Mask (A1) If set, then bit 1 of the Absolute Address value must match the corresponding pipe absolute address bit, otherwise this bit is ignored in the compare.

Bit 7 Absolute Address Bit 2 Mask (A2) If set, then bit 2 of the Absolute Address value must match the corresponding pipe absolute address bit, otherwise this bit is ignored in the compare.

Bit 8 Absolute Address Bit 3 Mask (A3) If set, then bit 3 of the Absolute Address value must match the corresponding pipe absolute address bit, otherwise this bit is ignored in the compare.

Bit 9 Absolute Address Bits 4:11 Mask (A4 11) If set, then bits 4:11 of the Absolute Address value must match the corresponding pipe absolute address bits, otherwise these bits are ignored in the compare.

Bit 10 Absolute Address Bits 12:19 Mask (A12 19) If set, then bits 12:19 of the Absolute Address value must match the corresponding pipe absolute address bits, otherwise these bits are ignored in the compare.

Bit 11 Absolute Address Bits 20:21 Mask (A20 21) If set, then bits 20:21 of the Absolute Address value must match the corresponding pipe absolute address bits, otherwise these bits are ignored in the compare.

Bit 12 Absolute Address Bit 22 Mask (A22) If set, then bit 22 of the Absolute Address value must match the corresponding pipe absolute address bit, otherwise this bit is ignored in the compare.

Bit 13 Absolute Address Bit 23 Mask (A23) If set, then bit 23 of the Absolute Address value must match the corresponding pipe absolute address bit, otherwise this bit is ignored in the compare.

Bit 14 Absolute Address Bit 24 Mask (A24) If set, then bit 24 of the Absolute Address value must match the corresponding pipe absolute address bit, otherwise this bit is ignored in the compare.

Bit 15 Absolute Address Bits 25:26 Mask (A25 26) If set, then bits 25:26 of the Absolute Address value must match the corresponding pipe absolute address bits, otherwise these bits are ignored in the compare.

Bit 16 Absolute Address Bit 27 Mask (A27) If set, then bit 27 of the Absolute Address value must match the corresponding pipe absolute address bit, otherwise this bit is ignored in the compare.

Shared Universal Counter (39)

Bit 1 Ignore Count for Station X (IX) Keep the Station X comparator disabled until n compares have been detected, where n is the counter value. So, for example, if one wanted to enable the trace controls on the fifth occurrence of a pipe event, they would set the counter to four and turn on this bit. The first four compares would not be reported, but the fifth one would trigger the pipe compare signal to the trace controls.

Bit 2 Ignore Count for Station Y (IY) Same as above, but for Station Y.

Bit 3 Stop Station X Comparator after n compares (SX) This bit enables the Station X comparator and keeps it enabled until the value in the counter is reached. After the nth compare, the station is automatically disabled.

Bit 4 Stop Station Y Comparator after n compares (SY) Same as above, but for Station Y.

Bits 5:16 Counter Value The 12 bit binary counter value.

Once the control and field registers are programmed with the proper settings, and the Event Monitor is enabled, then the field comparators begin monitoring for the desired data.

As eluded to earlier, these registers are accessible while the system clocks are running by executing a series of microcode instructions. Thus if a problem occurs in the system, one can load and execute a microcode patch containing the instructions necessary to program the Hardware Event Monitor to look for and trap debugging information. This can be extremely useful in situations where a problem can be reproduced on demand, but requires multiple traces of debug data, taken from different perspectives, in order to solve the problem. Furthermore, since the trace arrays normally run in a default mode which may not be suitable for all types of problems, the accessibility of the Control Registers over the UBUS permits programmers to temporarily switch the compare and trace modes on the fly to accommodate specific types of problems, then allow the monitor and trace arrays to revert back to their default running modes once the debugging data has been captured. For example, a situation may exist whereby the same hardware error checker activates under two different application scenarios. In one application scenario, the underlying cause of the problem lies within several cycles of the ensuing error checker, therefore the default trace and field monitors sufficiently capture the debugging data. However, in the other application, the root cause of the problem necessitates capturing a "state machine" trace whereby multiple states of an operation must be monitored, and upon detecting one, the the trace arrays must be enabled for a few cycles then disabled until the next state event occurs. Our invention easily accommodates this by allowing a microcode patch to be installed for the second scenario. In fact, one could envision an entire "knowledge base" of problem scenarios with corresponding microcode patches to address each type of problem.

It should be noted that the means for externally programming the hardware monitor are not limited to those described in this disclosure. One skilled in the art can contemplate alternate embodiments of this invention coupled with other means for external accessibility. Consider for example the Hardware Event Monitor embodied in a Microprocessor with registers directly accessible via interrupts from application programs, or field upgradable BIOS routines. This would enable customer systems to run diagnostic software or BIOS patches capable of programming the Hardware Event Monitor to capture data more intelligently. These patches might be derived from a database of problem reports, a technician's need to acquire additional data, or automatically generated by an artificial intelligence algorithm executing rules from a knowledge base.

Another possible embodiment which exemplifies the potential of the present invention is the use of Digital Signal Processors (DSPs) in a device such as a modem. Since these devices are highly programmable, one could envision our invention included within such a DSP. Since the DSP may function in slightly different modes when performing a data communication protocol (such as VT100) as opposed to a faxing operation, the modem control software could set up the comparator differently depending on whether the user is running the communication software or the fax software.

Figure 4:
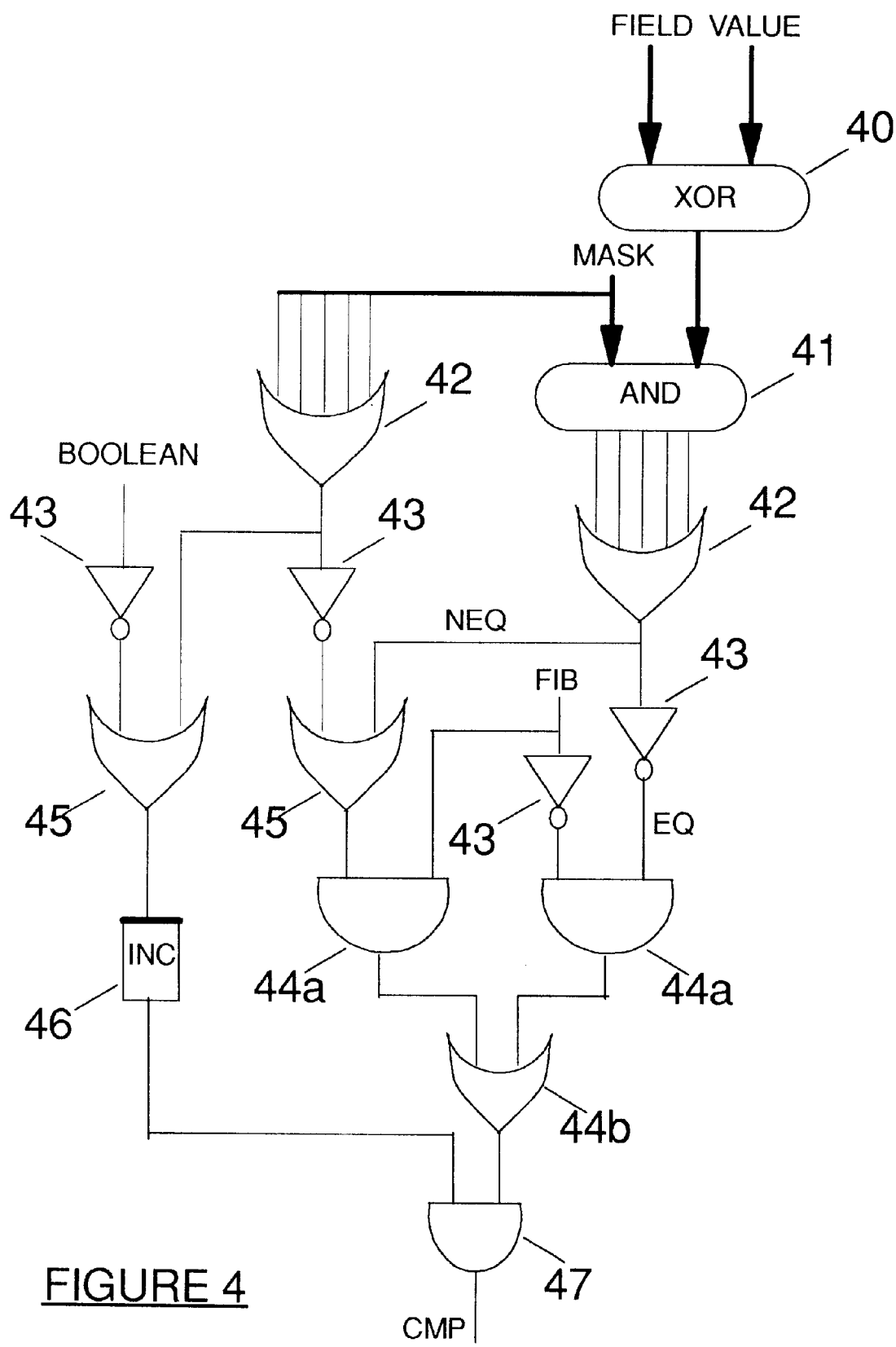
FIG. 4 illustrates the detailed embodiment of a single Field Comparators (21).

FIG. 4 illustrates the detailed embodiment of a single Field Comparators (21). All of the regular field compares are implemented identically regardless of the size of the field. The actual field (ie. The Command field from the C1 Pipe Stage) is matched against the value programmed into that field's value register (ie. Bits 11 to 16 of the Pipe Command Register (33)) using an XOR (40) circuit. The output of the XOR (40) circuit is AND'd (41) with the mask value (ie. Bits 3 to 8 of the Pipe Command Register (33)). In the case of a multi-bit field, each output bit of the AND (41) is OR'd (42) to form a Not Equal signal. This is distributed to OR gate (45) and to Inverter (43) to form an Equal signal. The combination of XOR (40), AND (41), OR (42) and Inverter (43) implement the following truth table for combining a Mask, Value and Field.

| F | V | M | Eq |
|---|---|---|---|
| 0 | 0 | 0 | 1 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 1 |
| 1 | 1 | 1 | 1 |

The function will produce an equality whenever the mask is zero or the value matches the field for the bit positions whose mask bits are set. It should be noted that OR gate (42) is not required for single bit fields.

In parallel to the aforementioned equality function, each bit of the mask is OR'd (42) together and complemented using Inverter (43) to form an Exclude from Compare signal. This is further combined with the Not Equal signal using OR gate (45). This signal will be active if the mask is zero or if the value does not match the field for the bit positions whose mask bits are set. Furthermore, this signal is multiplexed with the Equal signal using the Field Invert Bit as the selector. The multiplexor is comprised of Inverter (43) AND gates (44a) and OR gate (44b). When the Field Invert Bit is zero, the mux (44) will pass the Equal signal, which is guaranteed to be on if the mask is all zero. If the Field Invert Bit is on, then the mux (44) will pass the output of OR gate (45) to the output. This will be active if the Not Equal signal is active, or if the mask is all zero. Thus the output of the mux (44) will be active anytime the mask is all zero or the field corresponds with the value, guided by the mask, in the manner edicted by the Field Invert Bit.

The left side of FIG. 4 shows the Boolean bit going through Inverter (43) and being OR'd (45) with the Mask is Zero signal. The output of OR gate (45) is fed into the Include latch (46). This latch is used to gate the output of mux (44) using AND gate (47) to form the final compare output.

In order to understand the reason for the existence of the Include latch, one must consider an example involving two fields where the mask for one field is all zeros and the mask for the other is all ones. A compare should only fire when the second field matches the corresponding value, regardless of the value of the first field (i.e. the first field is a don't care). When the Event Monitor (10) is running with the Boolean Bit in AND mode, don't care fields (i.e. those with all zero masks) must contribute a "one" to the overall compare when the non-zero mask fields are contributing a "one". However, if the same example is applied to the Event Monitor (10) running with the Boolean Bit in OR mode, then a don't care field must not cause a false compare. Therefore, in one case don't care fields (i.e. those with all-zero masks) must behave as if they detect a compare on every cycle, whereas in the second case those same fields can't trigger a compare on any cycle otherwise they would trigger a false overall compare. The Include bit (46) of the present invention determines whether the corresponding field will participate in or abstain from the overall compare. If any mask bits are on, it implies the field should participate in the compare, regardless of the Boolean bit. On the other hand, if the mask is all zero then the Boolean bit determines the outcome. If the boolean bit is off (AND Mode), then the field will participate since the equality function described above will automatically trigger an equality. Otherwise, if the boolean bit is on (OR Mode), and the mask is all zero, then the field is absent from the overall compare. In other words, in OR mode, only those fields with non-zero masks participate in the overall compare.

Our invention contemplates the use of this single bit Include latch (46) on every field in a novel manner. Without the latch, this logic structure would be inherently redundant and untestable, unless it is further decomposed into a multitude of boolean algebraic components. Construction of a testable structure without any latches requires a less efficient design in terms of gate count and reuse. However, our invention exploits the fact that the Event Monitor (10) take several cycles to fully program before a compare operation can be initiated. Therefore, introduction of a single staging latch allows the use of a symmetric, low gate count design while eliminating the inherent redundancy. Furthermore, the Include latch will be set tip prior to the time when the field inputs are valid.

The Programmable Address Compare (23) depicted in FIG. 2, is implemented in a similar fashion to the regular field compare functions described in FIG. 4. The only difference is the addition of a decoder which monitors the Pipe Command field, and decodes it to determine if the data residing in the Pipe Absolute Address field is of the desired type indicated by bits 5 and 6 of Master Control Register Part 2 (31). Once again, it should be noted that alternate embodiments can exist which employ different means for resolving the type of information currently being multiplexed into the field, and comparing this to the target type programmed into the Master Control Register.

Figure 5:
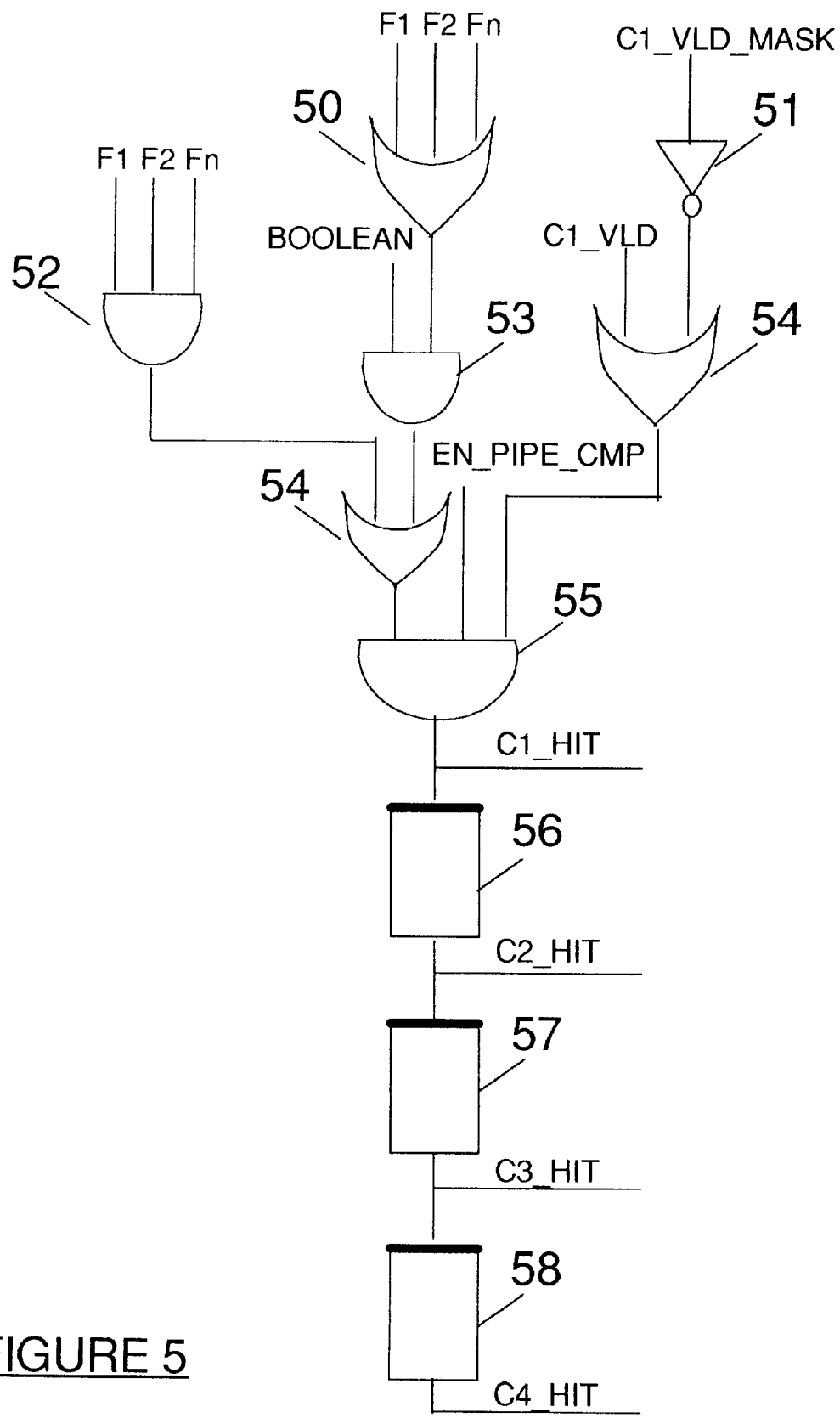
FIG. 5 shows a Compare Accumulator (22).

Turning our attention to FIG. 5, the detailed description of a Compare Accumulator (22) is disclosed. The purpose of the Compare Accumulator (22) is to gather all the field compares and formulate a series of overall compares for each pipe. The function illustrated in FIG. 5 takes each field compare (denoted F1, F2, Fn) and performs an AND function (52) and an OR function (50). The output of the OR (50) is further AND'd with the Boolean Bit in 2-Way AND gate (53). The outputs of Field AND (52) and 2-Way AND gate (53) are sent to 2-Way OR gate (54). If the Event Monitor (10) is in AND Mode (Boolean Bit equals zero), and all the fields compare, then Field AND (52) will be active. On the other hand, if the monitor is in OR Mode (Boolean Bit equals one), and any field compares, then the output of AND gate (53) will be active.

In either case, it will trigger OR gate (54) which is combined into 3-Way AND gate (55) with the Enable Pipe Compare bit (i.e. Master Control Register Bit 3) and the output of 2-Way OR gate (54). This OR gate combines the C1 Valid field with the Inverted C1 Valid Mask (51) (Master Control Register Bit 9). Thus, if the mask is off then the compare will be allowed to flow through 3-Way AND (55), otherwise the compare will only be allowed if the C1 pipe stage is valid. The output of 3-Way AND (55) forms the C1 Hit signal. This is staged into the C2 Hit Latch (56), the C3 Hit Latch (57) and the C4 Hit Latch (58). All of these hit lines are sent to the Final Compare Report Station (24).

Figure 6:
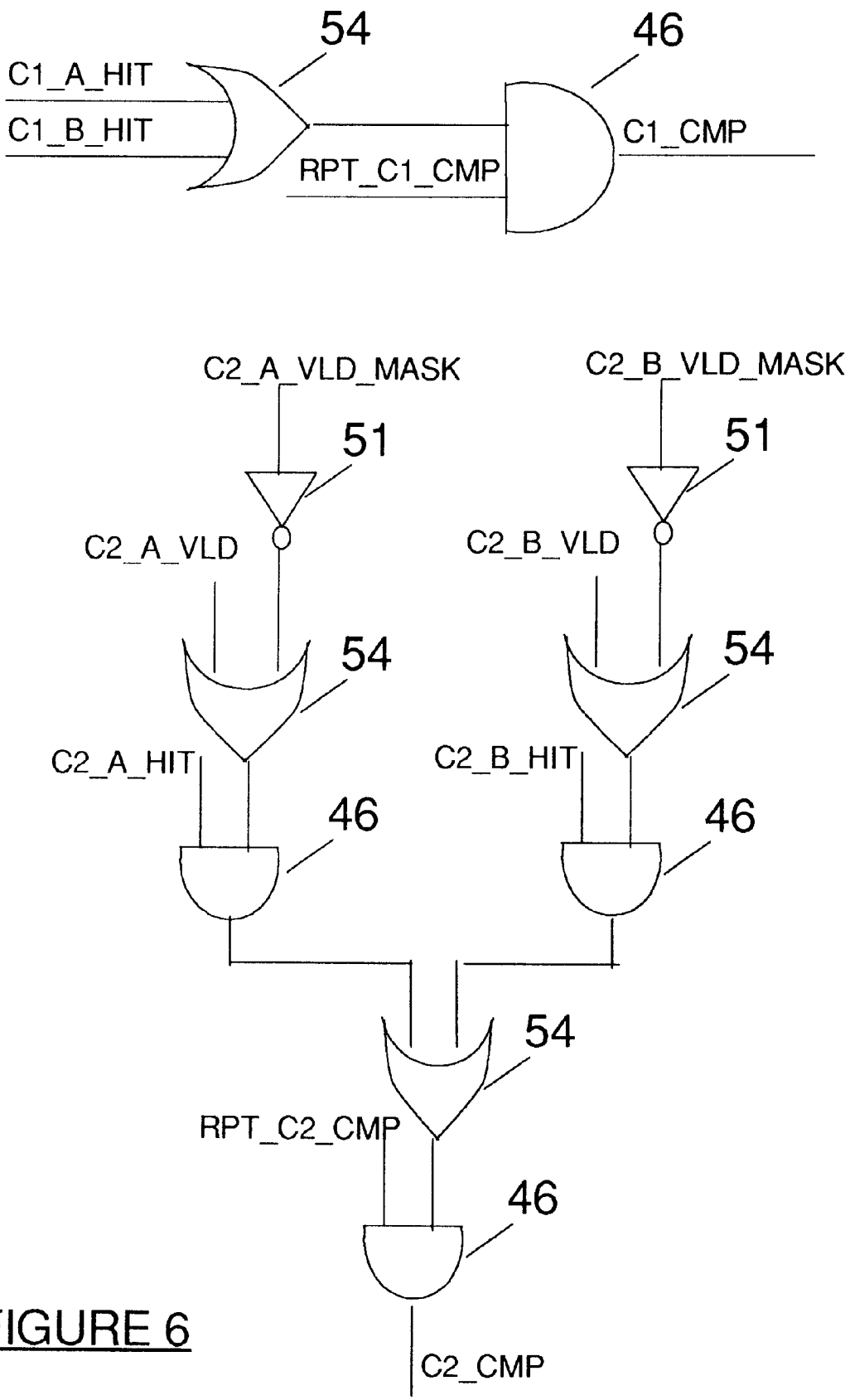
FIG. 6 depicts the details behind the Final Compare Report Stage (24). is

FIG. 6 depicts the details behind the Final Compare Report Stage (24). The purpose of this function is to gather the hit signals for all four stages from both pipes and assemble them into a single Overall Compare signal for each Compare Station. The Final Compare Report Stage is comprised of one sub-function for each pipe stage. The top of the drawing shows the simplest sub-function which handles the compare report for the C1 stage. Since our preferred embodiment contains two pipes, the OR gate (54) performs a 2-way OR of the C1 hit signals from pipe A and pipe B. The output of this OR feeds the 2-Way AND (46) where it is gated with the Report C1 Compare signal (Bit 13 of Master Control Register Part 2 (31)). The output of this sub-function is the final compare for the C1 cycle.

The lower half of FIG. 6 illustrates a single copy of the sub-functions which report compares for the C2, C3 and C4 pipe stages. All three of these sub-functions are identical, so only one instantiation is shown in the drawing. The sub-function consists of one path for each pipe whereby the Valid Field is OR'd with the Inverted Valid Mask (51) using 2-Way OR (54) in a fashion similar to the C1 valid described in the upper right corner of FIG. 5. The output of 2-Way OR (54) is combined with the output of C2 Hit Latch (56) using 2-Way AND (46). The C2 Hit Latches, C2 Valid Fields, and C2 Valid Masks for both pipes are processed in the aforementioned fashion and their outputs are OR'd using 2-Way OR (54). The output of this OR is AND'd with the Report C2 Compare using 2-Way AND (46) to generate the final compare for the C2 cycle. The final compares for the C3 and C4 cycles are arrived at in the same manner.

Figure 7:
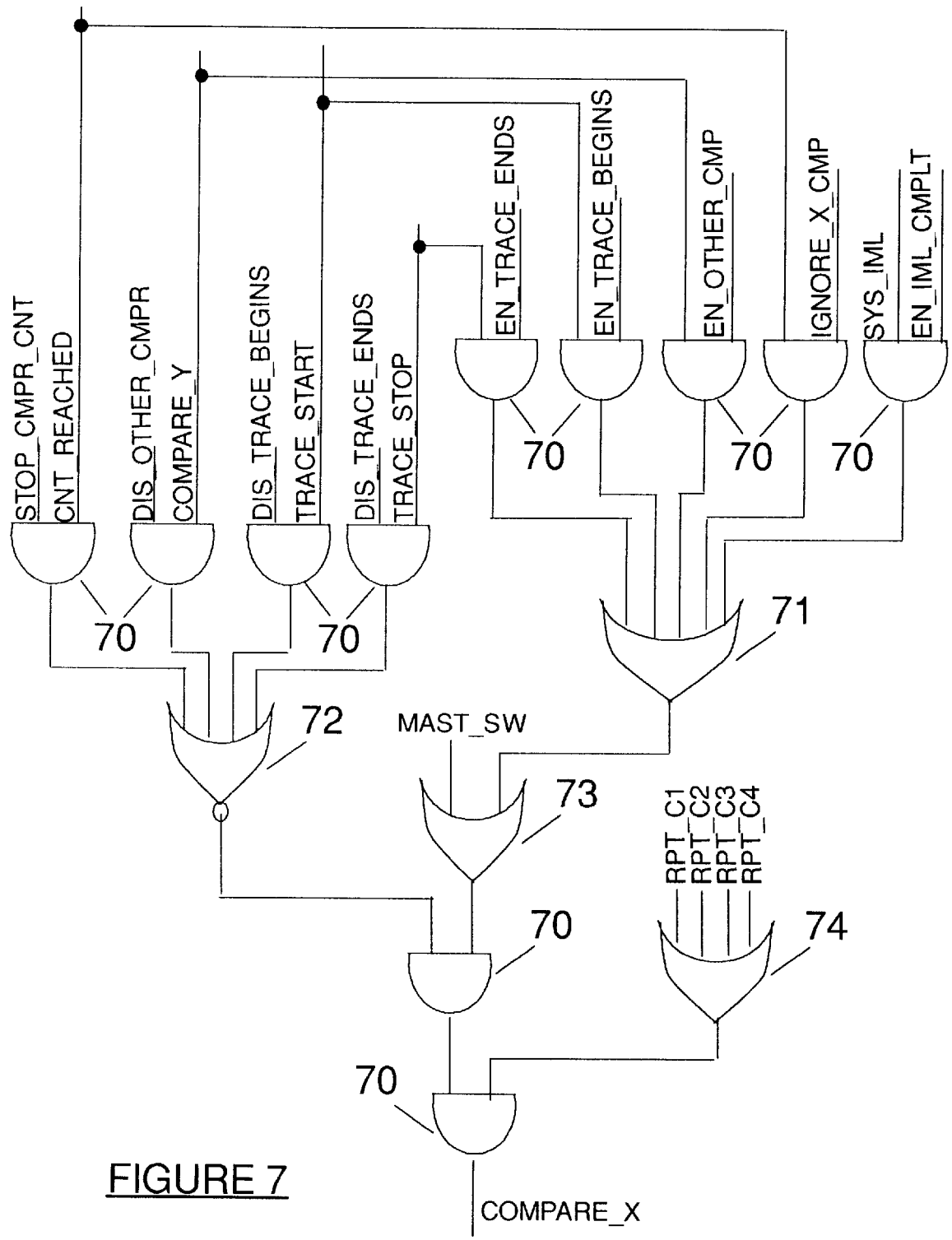
FIG. 7 illustrates the Final Compare Report Stage (24) to which all Pipeline Stage Compares are sent.

All four Pipeline Stage Compares are sent to the Final Compare Report Stage (24) which is described in further detail in FIG. 7. The four report signals are fed into a 4-Way OR (74) shown in the lower right portion of the drawing. The output is gated using 2-Way AND (70) with an allow compare signal generated by the cone of logic terminating at the other 2-Way AND (70). This signal determines whether the current system state matches the desired conditions preset in the Master Control Registers (30 and 31), thereby permitting the detected compare to be reported externally. 2-Way AND (70) is fed by 2-Way OR (73) which contains the conditions which allow the compare to be reported. These conditions are formed by 2-Way OR (73), 5-Way OR (71) and five 2-Way ANDs (70). The function is relatively straightforward whereby 2-Way OR (73) will fire if the Master Switch (30 Bit 1) is active or any of the five other conditions occur. These conditions allow the compare station to awaken from an inactive state when one of these events occur. They are defined as:

1. The Enable Trace Begins (30 Bit 5) is set and the Trace Start signal from the Trace Controls is active.
2. The Enable Trace Ends (30 Bit 7) is set and the Trace Stop signal from the Trace Controls is active.
3. The Enable When Other Station Compares (30 Bit 3) is set and the other Compare Station reports a compare.
4. The Ignore N Compares (39 Bit 1) is set and the Universal Compare Counter reaches the value programmed into Register 39 Bits 5 thru 16.
5. The Enable when IML Complete (30 Bit 2) is set and the System IML signal is received.

The 2-Way NOR (72) is used to collect the four conditions that would block the compare from being reported. These exemplify how the compare station can be automatically shut down by external events. They are defined as:

1. The Disable Trace Begins (30 Bit 6) is set and the Trace Start signal from the Trace Controls is active.
2. The Disable Trace Ends (30 Bit 8) is set and the Trace Stop signal from the Trace Controls is active.
3. The Disable When Other Station Compares (30 Bit 4) is set and the other Compare Station reports a compare.
4. The Stop after N Compares (39 Bit 3) is set and the Universal Compare Counter reaches the value programmed into Register 39 Bits 5 thru 16.

As long as one of the conditions which allows the reporting is active, and none of the conditions trying to block the report are active, then 2-Way AND (70) will activate the overall allow compare and successfully pass the reported compare through the final 2-Way AND (70) to form the Compare_X signal. This signal is reported externally and used to drive the other functions such as Trace, Instrumentation, Dither, Hardware Error Inject, etc. as previously described. It should be noted that FIG. 7 depicts the Compare Station (24) for Station X. An identical functional block exists for Station Y which produces the Compare_Y signal. These signals are cross connected to each of the compare stations to allow the detection of an event in one station to enable or disable monitoring for a second event in the other station.

As stated previously, hardware elements 21, 22, 23 and 24 of FIG. 2 are all replicated in their entirety to form two distinct compare stations. With the exception of the Counter Register (38), all of the remaining registers in FIGS. 3A and 3B exist for Station X and Station Y. Each station distributes its own Compare Signal to the external functions in FIG. 1B, therefore each station can operate completely independently monitoring for separate events. However, one of the most powerful aspects of the present invention is the ability to chain the stations together to monitor for sequences of events. Consider the example where one wants to trap information about an address in a commonly used subroutine of a program, but it must be trapped only when that routine is invoked by a particular calling program. With a single compare station, the address would be monitored and if the routine was indeed very common, chances are the compare would fire because the subroutine was invoked by some other means. Our invention allows one compare station to monitor for the calling program, and only when it's active, enabling the second station to begin monitoring for the subroutine address.

Several aspects of the present invention are worth noting. To begin with, the parallel paths in FIG. 6 comprising Inverter (51), OR gate (54) and AND gate (46) could have been implemented between the C1 Hit Latch (55) and C2 Hit Latch (56), and in most cases would produce the same result. However, since our embodiment permits the Control and Field Registers to be updated over the UBUS at any time, a window case could exist where the Valid Field or Mask could change on the same cycle that the C2 Hit Latch is loaded. To ensure complete accuracy of the C2 compare, our invention evaluates the Valid Field and Mask during the C2 cycle.

Secondly, the preferred embodiment is depicted using two compare stations comprising dual 4-stage pipes. One skilled in the art can appreciate how easily the present invention can be scaled in either direction to increase or decrease the number of compare stations, pipes and/or pipeline stages without compromising the spirit of the invention. Thirdly, none of the bits in the Master Control Register are mutually exclusive, therefore a wide range of compare scenarios can be envisioned. For example, all four of the Report Cx Compares bits (bits 13 through 16 in Master Control Register Part 2 (31)) can be on simultaneously. This would result in a single event creating four successive compare triggers. Furthermore, if all four Mask Cx Valid bits (bits 9 through 12 in Master Control Register Part 2 (31)) are also on, then successive compares would only occur if the event remained valid as it flowed through the pipe. Thus, one could use this to instrument how often operations get rejected including mapping the percentage of events that are rejected in each pipe stage.

Lastly, the entire implementation is constructed using standard logic gates with no reliance on deep sub-micron custom design techniques or expensive devices such as embedded SRAMs. This permits our monitor to coexist in a wide variety of applications without the need for any special hardware.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A method for monitoring hardware events in a computer system, comprising the steps of:

implementing a hardware event monitor of control registers and having programmable generic fields which can be internally or externally programmed for monitoring events ranging from simple operations to complex event sequences and using programmed criteria incorporated into said hardware event monitor to monitor events within said computer system by initiating successive compares of programmed criteria with processing events, and using said hardware event monitor to trigger external actions upon successful detection of compares indicating that all criteria programmed into the hardware event monitor have been achieved, and wherein all aspects of the event monitor are replicated to form two or more Compare Stations, each of which can operate independently as disjoint functional units or can be chained together to act as a single entity; and each of said Control Stations can monitor all fields, of any and all pipelines or other resources of said computer system, each Compare Station providing an independent compare output signal governed by a unique set of Control Registers for that Compare Station, and using a unique or shared event counter, whereby said compare output signals of each station can be used to trigger the same external actions and can be used to trigger different external actions and can be further combined using AND/OR/Invert (AOI) logic to create "super compare" functions such as, but not limited to:

$(F1x*F2x)+(F1y*F2y)$ $(F1x+F2x)*(F1y+F2y)$.

2. A method according to claim 1, wherein programmable generic fields are masked with corresponding field masks to expand the scope of the compares to perform operations, including one or more matches selected from a group consisting of: an exact match against a field, wildcard matches against portions of a field, or exclusion of unwanted fields from the compare, or a combination thereof.

3. A method according to claim 1, wherein a programmable fields has control bits used for providing information, and said control bits are used to decode a portion of said field or a completely different field to discern the type of information currently residing in the field, matched against corresponding control bits which exist as part of said field or existing in a separate field, and upon detecting a match, allow the contents of said field to participate in the compare.

4. A method according to claim 3, wherein one or more multistage pipelines of said computer system are monitored by controls permitting the compare to be reported in any, or all, stages of the pipeline; and by compare logic for the first stage of the pipeline such that a resulting compare is captured in a one-cycle staging register and pipelined once for each stage, wherein the output of each staging register is combined with the corresponding control bits to determine whether the compare should be reported on that cycle.

5. A method according to claim 4, wherein is included controls for selecting which pipeline should participate in a compare; and controls permitting compares to be reported only if the operation is valid in a corresponding pipeline stage.

6. A method according to claim 1, wherein said computer system provides a Compare Type switch to control whether the fields are AND'd or OR'd together to form an overall compare, and for combining individual field compares together according to the Compare Type Switch using Field Include Bits to perform an appropriate boolean field function using a one-cycle delay to reuse gate-level building blocks for testability.

7. A method according to claim 1, wherein compares can be made against the inverse of a multi-bit field.

8. A method according to claim 1, wherein event monitoring is delayed until after resetting or rebooting (IML) of the system to prevent unwanted compares during an IML phase.

9. A method according to claim 1, wherein the hardware event monitor's Control Registers and fields can be programmed over a Microcode Bus (UBUS) permitting microcode patches or other similar means to be applied while the systems clocks are running.

10. A method according to claim 9, wherein said Control Registers and fields are directly manipulated by the Operating System, Application Software, Operator's Service Console, and by loading hardware registers through external means to allow the hardware event monitor to be programmed.

11. A method according to claim 10, wherein said hardware event monitor is remotely programmed by delivering the desired contents of the Control Registers and fields via Local Area or Wide Area Networks, telephone connections, the Internet or through other conduits, including upgradable BIOS and Digital Signal Processor code patches.

12. A method according to claim 1, wherein is included controls permitting the event monitor to suppress reporting of compares until after "N" successful compares have occurred; and controls permitting the event monitor to disable reporting further compares after "N" successful compares have occurred.

13. A method according to claim 1, wherein all aspects of the event monitor are replicated to form two or more Compare Stations, each of which can operate independently as disjoint functional units or can be chained together to act as a single entity; and each of said Control Stations can monitor all fields, of any and all pipelines or other resources of said computer system, each Compare Station providing an independent compare output signal governed by a unique set of Control Registers for that Compare Station, and using a unique or shared event counter, whereby said compare output signals of each station can be used to trigger the same external actions can be used to trigger different external actions can be further combined using AND/OR/Invert (AOI) logic to create "super compare" functions such as, but not limited to, $(F1x*F2x)+(F1y*F2y)$ $(F1x+F2x)*(F1y+F2y)$.

14. A method according to claim 13, wherein the output of one Compare Station is used to enable another Compare Station to begin monitoring for the same or different events, and said first Compare Station can be used to disable another Compare Station, thus permitting complex event sequences to be monitored.

15. A method according to claim 14, wherein compare output signals from the hardware event monitor are used to trigger external actions for one or more of actions selected from the group of gathering problem debug information using trace arrays, instrumentation sampling for performance analysis, hardware error injection for recovery and diagnostic testing, enabling dither to break resource deadlocks.

16. A method according to claim 15, wherein said hardware event monitor operates independently of trace controls such that said event monitor targets one event while trace controls gather data for an unrelated event.

17. A method according to claim 1, wherein said hardware event monitor operates independently of trace controls and as an extension to system trace controls in which event monitoring can be enabled or disabled when trace gathering starts, trace gathering stops, or compares can only be reported when the trace is actually running.

18. A method according to claim 17, wherein trace gathering can be started, stopped, and advanced by a programmable number of cycles whenever successful compares are reported permitting said hardware event monitor and trace controls to act as a single unified entity such that all modes of operation available to both functions independently can be combined to accomplish monitoring and data gathering applications including tracing state machines, capturing small snapshots of multiple passes of a single event, and trapping events within subroutines invoked by a particular driver program.

19. A method according to claim 18, wherein said hardware event monitor and trace controls act as a single unified entity with remote programming of said hardware event monitor and trace controls over a UBUS to permit capturing and logging problem debugging and instrumentation data for use in remote system administration, technical support assistance, field and customer engineering applications, and performance analysis.

20. A method according to claim 1, wherein none of the bits within said Control Registers are mutually exclusive.

* * * * *